March 25, 1958 A. F. ERICKSON 2,827,796
EXPANSIBLE SPROCKET
Filed Nov. 26, 1954

INVENTOR.
Anton F. Erickson
BY
His Attorney

United States Patent Office 2,827,796
Patented Mar. 25, 1958

2,827,796

EXPANSIBLE SPROCKET

Anton F. Erickson, Dayton, Ohio, assignor to General Motors Corporation, Detroit, Mich., a corporation of Delaware Application November 26, 1954, Serial No. 471,311

4 Claims. (Cl. 74—244)

The invention relates to power transmitting members and is particularly concerned with sprocket assemblies wherein the pitch diameter of the sprocket may be varied within predetermined limits.

It is therefore the basic object of this invention to provide a variable pitch sprocket assembly wherein the sprocket portion thereof is formed from resilient material, such as a rubber-like material.

In carrying out this object it is a further object of the invention to provide a sprocket assembly wherein an annular resilient sprocket is used which may be assembled with a pair of concentrically arranged clamping rings upon a hub wherein means are provided for adjusting the distance between the clamping rings for holding the sprocket and for exerting a predetermined compressive force thereon, change in the said distance resulting in a change in pitch diameter of the sprocket within predetermined limits.

In carrying out the above objects it is a still further object of the invention in some cases to use spacer rings positioned between said concentrically arranged clamping rings for limiting the compressive force of said clamping rings upon the sprocket wherein the pitch diameter of the sprocket may be predetermined by selecting a spacer ring having a desired width.

It is another object of the invention to provide a sprocket assembly including a resilient rubber-like sprocket having a central aperture therethrough with integral beads at opposite sides thereof adjacent said central aperture, said beads forming a locating means for the clamping rings which have complementary portions thereon that overlap said beads whereby when the clamping rings and sprocket are assembled onto a hub the sprocket is maintained in concentric relation thereto.

Further objects and advantages of the present invention will be apparent from the following description, reference being had to the accompanying drawings, wherein preferred forms of the invention are clearly shown.

Figure 1:
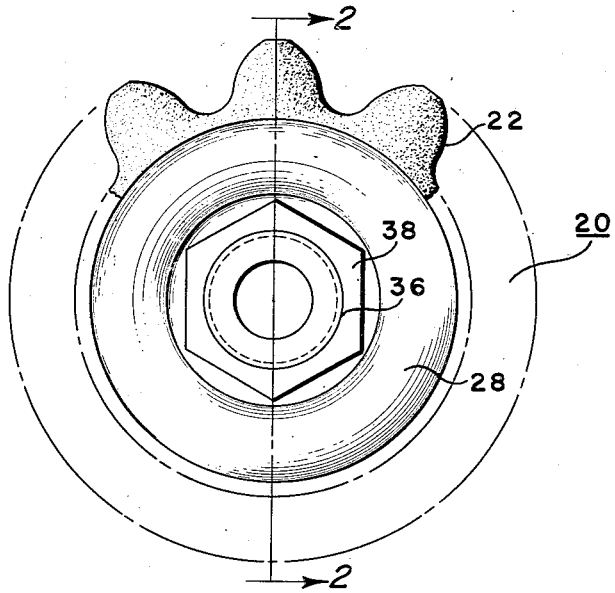
Figure 1 is a plan view of a sprocket assembly.
Figure 2:
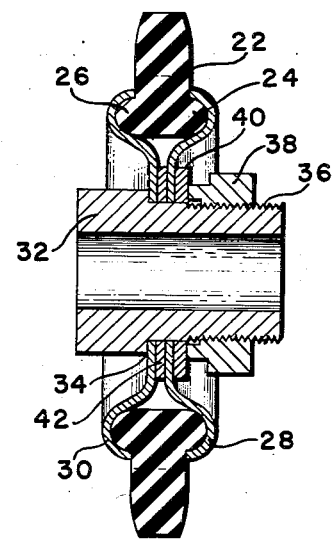
Figure 2 is a section taken on the line 2—2 of Figure 1.

Variable pitch sprocket assemblies are highly desirable in chain drive applications. Frequently the chain is too long to provide satisfactory engagement and yet the excess length is not sufficient to permit the elimination of a link. In these cases if the driving and driven member are not laterally adjustable the chain cannot be tightened. Furthermore, change in pitch may be used to vary the speed of the drive within limits.

The present invention is directed to a sprocket assembly which eliminates these past difficulties in that a sprocket assembly is provided which within itself is variable with respect to the pitch thereof. Thus minor adjustments may be readily accomplished through varying the pitch of the sprocket within limits.

The present sprocket assembly has another advantage in that the sprocket per se is resilient, being formed from a rubber-like material whereby the sprocket drives the chain noiselessly and wherein the teeth of the sprocket are self-adjusting with respect to the chain to a limited degree.

In this respect the sprocket may be formed from compositions of natural rubber, butadiene-styrene copolymers, butadiene-acrylonitrile copolymers, polychloroprene, compatible mixtures of any of the above and in fact any satisfactory elastomer which may be compounded to yield the desired hardness as measured by a durometer reading. The durometer reading in most cases is preferably above 60 so that the part is not too soft, although the specific hardness of the rubber is obviously a matter of choice with respect to the specific application of the sprocket assembly. In some cases it may also be desirable to reinforce the elastomeric sprocket by the inclusion of fabric therein as is well known in the art. In these cases the degree of pitch variation within the sprocket is reduced but the sprocket maintains its noiseless characteristics and it is therefore still highly desirable.

Referring specifically to the drawings, a sprocket assembly is shown at 20 including an elastomeric annular sprocket ring 22 which includes a pair of opposed annular beads 24 and 26 at opposite sides thereof adjacent a central aperture. The beads 24 and 26 cooperate with a pair of metal clamping rings 28 and 30 respectively which include portions thereon that engage the beads 24 and 26. A hub assembly 32 is provided which may include a shoulder 34 thereon that abuts the clamping ring 30 and which is threaded at the opposite end thereof as at 36. A clamping nut 38 may be threaded on the end 36 and tightened into engagement with the clamping ring 28. A washer 40 may be provided if desired in interposed relation between the ring 28 and the nut 38.

In some cases it may be desirable to interpose a second washer or spacer 42 between the clamping rings 28 and 30. In this manner the movement of rings 28 and 30 toward one another may be limited to any desired degree.

Figures 3, 4:
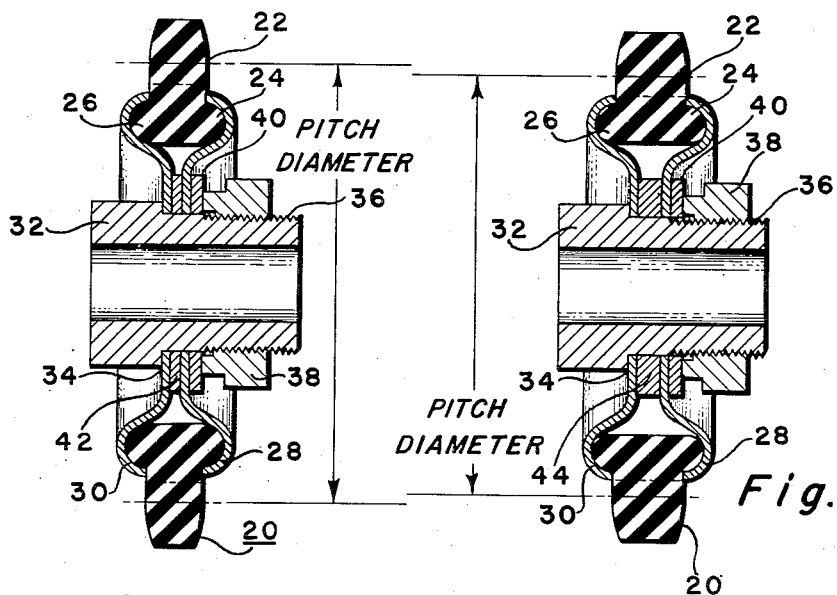
Figure 3 is a view similar to Figure 2.
Figure 4 is a view similar to Figure 2 wherein a different width spacer is used whereby the pitch diameter of the sprocket is changed.

In Figures 3 and 4 a cross section of the sprocket 20 is shown wherein two different spacers 42 and 44 are used. It is apparent from the drawing that when spacer 44 is used, that the distance between the clamping rings 28 and 30 is greater than in the case of the sprocket shown in Figure 3 wherein the spacer ring 42 is used. In this connection it is apparent that the rubber part 22 is compressed to a greater degree in the sprocket shown in Figure 3 than in the sprocket shown in Figure 4. This increased compression causes the sprocket to be displaced radially outwardly for increasing the pitch diameter thereof within predetermined narrow limits.

It is apparent that a plurality of adjusting positions may be accomplished through the use of different width spacing rings whereby predetermined desired results may be accomplished. It is also apparent that no spacer rings need be used if the clamping rings are varied in their contours and shapes. In other words the same results can be obtained through the use of different shaped clamping rings although this latter deviation is more costly, and in the preferred embodiment the change and compression of the rubber part is preferably accomplished through a change in the spacer alone.

From the foregoing it is manifest that I have provided an improved sprocket assembly which has many applications in the mechanical arts. The assembly is silent in its operation, it is adjustable through minor predetermined limits as to its pitch diameter and the tooth spacing is sufficiently flexible to eliminate binding due to inaccuracies in the links of the chain, etc. The sprocket has many applications where reasonable loads are transmitted through the chain drive.

While the forms of embodiment of the invention as herein disclosed constitute preferred forms, it is to be understood that other forms might be adopted, as may come within the scope of the claims which follow.

What is claimed is as follows:

1. A variable pitch sprocket assembly comprising in combination, an elastomeric annular sprocket having outwardly extending radially disposed unsupported teeth therearound arranged in equally spaced relation, said sprocket including a central aperture therethrough, a pair of opposed beads integrally formed thereon and positioned immediately adjacent said central aperture at opposite sides of said sprocket for supporting the beads and terminating adjacent the roots of said teeth, a pair of annular concentrically arranged clamping means positioned in opposed relation on opposite sides of said sprocket, each of said means including enlarged annular portions at their outer diameters adapted to conform with the contour of the beads on said sprocket and to overlie and grip said beads wherein the said teeth are unsupported and extend outwardly beyond said clamping means, a hub adapted to pass centrally through the clamping means and sprocket, and means associated with said hub for forcing said clamping means toward one another and into clamping relation with said sprocket, whereby the pitch diameter of said sprocket may be increased within limits by an increase in compression exerted upon said beads by said clamping means.

2. The sprocket claimed in claim 1 wherein a spacer is provided to limit the movement of said clamping means toward one another through the use of said last named means.

3. A variable pitch sprocket assembly comprising in combination, an elastomeric sprocket of annular shape having equally spaced outwardly extending teeth thereon and including a central aperture having outstanding beads at opposite sides thereof at the boundaries of said aperture and adjacent the roots of said teeth, a pair of clamping members adapted to be disposed at opposite sides of said sprocket and in opposed relation to one another, said members having central apertures therethrough and including portions which overlie and engage said beads for supporting the same, said members terminating adjacent the roots of said teeth, a hub adapted to pass through the apertures in said members and said sprocket and including a thread at one end thereof and a shoulder adjacent the other end thereof, said shoulder engaging one of said members, and a nut adapted to be threaded onto said hub at the threaded end thereof and to engage the other of said members, whereby said members may be forced toward one another for clamping the sprocket therebetween with a variable force as determined by the position of said nut so as to vary within narrow limits the pitch diameter of said teeth.

4. The assembly claimed in claim 3 wherein spacing means are interposed between said members for limiting the inward movement of said nut with respect thereto.

References Cited in the file of this patent

UNITED STATES PATENTS

| 289,368 | Osborne | Nov. 27, 1883 |
| 708,232 | Jackling | Sept. 2, 1902 |
| 1,235,734 | Stange | Aug. 7, 1917 |